Sept. 1, 1931. H. W. KA DELL 1,821,016
ELECTRICAL FILTERING SYSTEM
Filed Oct. 14, 1927
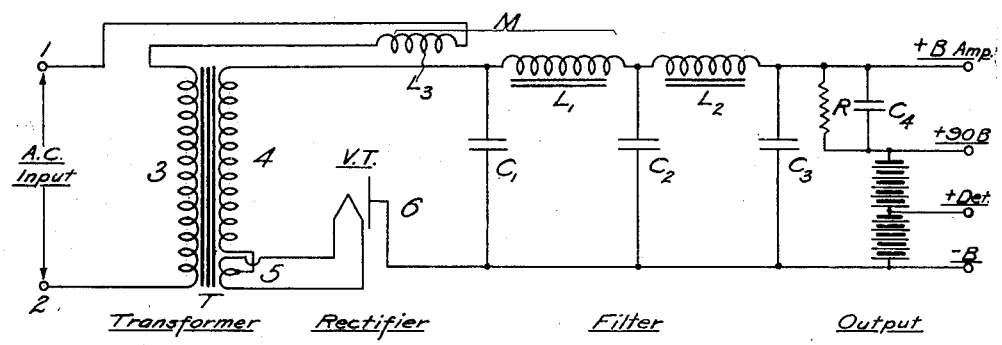
Inventor:
H. W. Ka Dell,
By Byrnes Townsend + Brickenstein,
Attorneys.

Patented Sept. 1, 1931

1,821,016

UNITED STATES PATENT OFFICE

HAROLD W. KA DELL, OF LAKEWOOD, OHIO, ASSIGNOR TO NATIONAL CARBON COMPANY, INC., A CORPORATION OF NEW YORK

ELECTRICAL FILTERING SYSTEM

Application filed October 14, 1927. Serial No. 226,209.

This invention relates, in general, to improvements in the filtering systems of electrical units designed to furnish direct current from an alternating current source; and particularly to that type of electrical unit which may comprise a transformer, a rectifier and filter means for converting alternating current into direct current.

The main purpose of the filtering system in such an electrical unit is to convert the pulsating current obtained from the rectifier into substantially non-pulsating direct current by removing from the filtered output current those alternating components which would appear as a noticeable hum in a reproducer or loud speaker contained in the output or load circuit.

This has hitherto been accomplished by employing successive filter sections, each one of which offered a high series impedance (commonly effected by an inductance or choke coil) and a low shunt impedance (commonly effected by a large capacity or condenser) to the pulsating current flowing through the filter system. This filtering action was secured by employing large values of inductance and capacity distributed in a small number of filter sections or by using smaller total amounts of inductance and capacity—but distributed in a larger number of filter sections. However, in either case such filtering systems are costly to construct and are bulky; i. e. they require a considerable amount of material and space.

My invention comprises a filtering system which accomplishes substantially complete removal of all alternating components from the filtered current supplied to the output circuit without requiring the use of bulky and expensive inductances (choke coils) or capacities (condensers); or alternatively without requiring a relatively large number of filter sections. Consequently, my system is comparatively simple and inexpensive because it is more economical of materials than the conventional systems now in use.

According to my invention, I provide means for neutralizing, to the desired extent, the unfiltered or alternating components in the filter current which would otherwise appear in the output or load circuit. I accomplish this, according to the preferred form of my invention, by introducing into the filter system alternating currents which are approximately equal in amplitude to, and substantially 180° out of phase with, the unfiltered or alternating current components which I desire to neutralize.

Although my invention may be suitably employed in any system of the type described, and may be used for a great variety of purposes where direct current, substantially free from alternating components, is required, a typical example of its application is a socket power unit for supplying space ("B") current to a radio receiver. Such a socket power unit may be of a type which supplies the entire "B" current directly from the alternating current source or of the type which employs "B" batteries floating across all or part of the direct current output circuits as a voltage regulator. I have here illustrated my invention in connection with a socket power unit which is a combination of these forms, and the invention will hereafter be described in that connection alone, it being understood that this is merely one example of its application.

Referring now to the drawing, the terminals for the alternating current input are shown at 1 and 2. These may suitably take the form of a cord and plug of the conventional type adapted for connection to an ordinary house light socket. A transformer T is provided with a primary winding 3 connected to the alternating current source and one or more secondary windings 4 and 5 designed to furnish the voltages required by the rectifier. The secondary winding 4 supplies high potential current to the rectifier system which is connected thereto. The particular type of rectifier, 6, which is used may depend upon and be adapted to the rectifying system employed. The rectifier may be of either the chemical (dry or liquid) type or the vacuum tube (hot-cathode or gaseous-conduction) type. I have here illustrated my invention as employing a vacuum tube rectifier of the hot-cathode type, although other types are equally applicable. Current for heating the cathode may be supplied from the secondary winding 5. Secondary winding 4 may be connected either to the mid point of secondary winding 5 as shown in the drawing, or it may be connected to either end of the secondary winding 5.

The filtering system is here shown as comprising certain shunt capacities $C_1$, $C_2$, and $C_3$, and series choke coils $L_1$ and $L_2$. Although I have illustrated two sections of filter, even a single filter section may in some cases be sufficient to eliminate hum to the desired extent, with the aid of my invention. In any case the above mentioned reductions in either the size of the reactive elements or number of filter sections may be realized. Any suitable output or load circuit may be employed. I have here illustrated, by way of example, an arrangement including 90 volts of "B"-batteries for feeding the detector and certain amplifier stages, and a resistance R (shunted by by-pass condenser $C_4$) connected in series with the "B"-batteries across the line, whereby the filter itself is used for supplying higher potential (say 135 or 180 volts) to the last amplifier stage.

The neutralizing means which I employ may comprise, in one modification of my invention, a coil $L_3$ connected to the alternating current source (for example, in series with the transformer primary, or shunted across the alternating current source) and coupled to a filter element, for example the coil $L_1$. By adjusting the relative positions or otherwise varying the coupling of the coils $L_1$ and $L_3$, the alternating current induced into coil $L_1$ from coil $L_3$ may be made approximately equal to, and substantially 180° out of phase with, the unfiltered alternating components in the filter, which would otherwise appear in the output circuit. Neutralization of these undesired alternating components, to any desired extent, is thereby obtained. Another means for accomplishing this same result is to arrange the transformer T in inductive relation, as regards its leakage magnetic flux, with a coil in the input filter section (for example the coil $L_1$). The relative positions of the transformer and the choke coil are then adjusted so that the stray transformer induction field reacts with the stray choke coil field so as to induce into the filtering system an alternating current approximately equal to, and substantially 180° out of phase with, the residual unfiltered components in the output section of the filter.

It should be understood that many variations of the specific arrangement herein described fall within my invention. For example, the filter may comprise more or fewer sections or the rectifier may be of other types, such as those mentioned above. The neutralizing coil, or transformer, or other neutralizing means, may be coupled to various elements of the filter (for example, coil $L_2$), or may be otherwise modified without departing from my invention. Other variations and modifications will be obvious from the foregoing description.

I claim:

1. An electrical filtering system for obtaining substantially constant direct current from an alternating current source, comprising, in combination, a transformer having a primary winding adapted to be connected to an alternating current source and a secondary winding, a filter connected to said secondary winding and including a series choke coil, a rectifier connected between said secondary winding and said filter, and a coil electrically associated with said transformer primary and arranged in inductive relation with said filter choke coil, whereby alternating currents are introduced into said filter tending to neutralize unfiltered alternating components therein.

2. An electrical filtering system for obtaining direct current substantially free from alternating components from an alternating current source comprising, in combination, a transformer having a primary winding adapted for connection to an alternating current source and a secondary winding adapted to energize a rectifier, a rectifier connected to said secondary winding, a filter fed from said rectifier and including a series choke coil, and an inductive coil electrically associated with said transformer primary and arranged in inductive relation with said series choke coil, whereby alternating currents are introduced into said filter which tend to neutralize the unfiltered alternating components which would otherwise appear in the output or load circuit connected to the filtering system.

In testimony whereof, I affix my signature.

HAROLD W. KA DELL.